United States Patent [19]

Koshima et al.

[11] Patent Number: 5,244,588
[45] Date of Patent: Sep. 14, 1993

[54] OVERBASED SULFURIZED ALKALINE EARTH METAL PHENATES AND PROCESS FOR PREPARING SAME

[75] Inventors: Hiroaki Koshima, Sodegaura; Takeshige Nakano, Ichihara; Tomiyasu Minokami, Sodegaura, all of Japan

[73] Assignee: Idemistu Kosan Co., Ltd., Tokyo, Japan

[21] Appl. No.: 794,048

[22] Filed: Nov. 19, 1991

[30] Foreign Application Priority Data

Nov. 19, 1990 [JP] Japan ................................. 2-311381

[51] Int. Cl.$^5$ ............................................ C10M 159/22
[52] U.S. Cl. ......................................... 252/25; 252/39; 252/42.7
[58] Field of Search ............................ 252/42.7, 39, 25

[56] References Cited

U.S. PATENT DOCUMENTS

| | | | |
|---|---|---|---|
| 3,036,971 | 5/1962 | Otto | 252/42.7 |
| 3,437,595 | 4/1969 | Coupland | 252/42.7 |
| 3,725,381 | 4/1973 | Sakai et al. | 252/42.7 |
| 4,123,371 | 10/1978 | Hori et al. | 252/42.7 |
| 4,196,089 | 4/1980 | Pitzer et al. | 252/42.7 |
| 4,710,308 | 12/1987 | Stauffer | 252/42.7 |
| 4,873,007 | 10/1989 | Chang | 252/40.7 |

FOREIGN PATENT DOCUMENTS

| | | |
|---|---|---|
| 0404178 | 12/1990 | European Pat. Off. . |
| 2123022 | 1/1984 | United Kingdom . |
| 2126602 | 3/1984 | United Kingdom . |
| 2197336 | 5/1988 | United Kingdom . |

*Primary Examiner*—Ellen McAvoy
*Attorney, Agent, or Firm*—Antonelli, Terry, Stout & Kraus

[57] ABSTRACT

Overbased sulfurized alkaline earth metal phenates which are oil soluble, excellent in detergency dispersancy and have high base value, and an effective process for production of said overbased sulfurized alkaline earth metal phenates under conditions providing less sludge and less raw material recovery, and further a lubricating oil additives containing said overbased sulfurized alkaline earth metal phenates as a main ingredient and a lubricating oil composition which comprises said lubricating oil additive compounded in a lubricating oil are disclosed. Since the resulting overbased sulfurized alkaline earth metal phenates have high base value and excellent oil-solubility, they can be effectively utilized as lubricating oil additives.

8 Claims, No Drawings

OVERBASED SULFURIZED ALKALINE EARTH METAL PHENATES AND PROCESS FOR PREPARING SAME

BACKGROUND OF THE INVENTION

1. Field of the Invention

The present invention relates to overbased sulfurized alkaline earth metal phenates and a process for preparing same. More particularly, the present invention relates to overbased sulfurized alkaline earth metal phenates which are oil soluble, excellent in detergency dispersancy and have high base value, and to an effective process for production of said overbased sulfurized alkaline earth metal phenates under conditions providing less sludge and less raw material recovery. Further, the present invention relates to lubricating oil additives containing said overbased sulfurized alkaline earth metal phenates as main ingredients and lubricating oil compositions which comprises said lubricating oil additives and lubricating oils.

2. Description of Related Art

In general, basic phenate type detergents are used in lubricating oil for internal combustion engine, and used as lubricating oil additives to neutralize acids such as oxyacid and sulfuric acid; to disperse sludge, lacquer, carbon and the like, and to prevent corrosion abrasion and sticking of piston packing rings.

However, the currently used basic phenate type detergents have problems, for example, they are less soluble in lubricating oil, and produce deposits in the engine, preventing normal operation.

Accordingly, techniques to produce basic phenate type detergents by various methods have been developed to solve such problems. For example, a process for production of calcium phenate using α-olefin as a raw material is described in Example 8 in Japanese Patent Publication No. 28878/1985. However, the product obtained by this process has low base value and poor dispersancy.

Calcium phenates with high base value are also known as improvements over said calcium phenate. But these have insufficient heat stability and detergency dispersancy.

Further, J. H. Walker, N. P. Seals, W. T. Stewart et al. report that they obtained sulfurized phenates by reacting a mixture of alkyl phenol, alkaline earth metal compound, ethylene glycol and sulfur in U.S. Pat. No. 2,680,096. But these phenates have poor stability and poor oil-solubility as lubricating oil additives. In U.S. Pat. No. 3,036,971, F. P. Otto reports he has upgraded the products by adding a $CO_2$ treatment step to the process of J. H. Walker. This process, however, can not provide products with sufficient base value.

W. J. Fox, J. Pennint et al. have succeeded in adding 1.5 times calcium to those done by F. P. Otto et al. (see Japanese Patent No. 474042). This process, however, requires that dihydric alcohol and calcium hydroxide be added to the reaction mixture and the reaction be repeated again. W. W. Hannemann has succeeded in compounding more alkaline earth metal per alkyl phenol compared with the product obtained by the process of F. P. Otto et al. (see Japanese Patent No. 437377). However, this process requires to add a metal salt of sulfonic acid and higher alcohol as raw materials in the process of F. P. Otto et al. In Japanese Patent Nos. 533078, 533079, 613542 and 613543, Sakai and Hori et al. disclose a process for production of basic phenate containing more excessive metal compared with those obtained by the conventional processes. However, this process also requires to use higher alcohols.

In Japanese Patent Publication No. 28878/1985, Hori, Hayashida et al. describe a process for production of basic phenates saving raw materials by using alkaline earth metal compounds with a lower stoichiometric amount of alkyl phenol. However, this process have several problems. For example, a large excess amount of starting alkyl phenol must be used to obtain the products and a large amount of alkyl phenol must be recovered.

SUMMARY OF THE INVENTION

An object of the present invention is to provide overbased sulfurized alkaline earth metal phenates with high base value.

Another object of the present invention is to provide a process for effectively producing said overbased sulfurized alkaline earth metal phenates with high base value.

Still another object of the present invention is to provide uses of said overbased sulfurized alkaline earth metal phenates with high base value.

That is, the present invention provides overbased sulfurized alkaline earth metal phenates having base value of 240 to 330 mg KOH/g, which are obtained by reacting alkyl phenol prepared from $C_{8-32}$ straight chain alkene and phenol, with sulfur, alkaline earth metal compound and dihydric alcohol, subsequently treating with carbon dioxide to give basic sulfurized alkaline earth metal phenates, and further subjecting to overbasification.

Further, the present invention also provides the overbased sulfurized alkaline earth metal phenates having base value of 240 to 330 mg KOH/g, which are obtained by reacting alkyl phenol prepared from $C_{8-32}$ straight-chain alkene and phenol, with sulfur, alkaline earth metal compound and dihydric alcohol, subsequently treating with carbon dioxide to give basic sulfurized alkaline earth metal phenates, and further subjecting to overbasification using the alkaline earth metal compound remaining in the reaction mixture, and further by adding fresh alkaline earth metal compound as needed, to provide the resulting overbased sulfurized alkaline earth metal phenates.

Moreover, the present invention provides a process for production of the above overbased sulfurized alkaline earth metal phenates. In addition, the present invention provides lubricating oil additives containing the above overbased sulfurized alkaline earth metal phenates with high base value as main ingredient, and lubricating oil compositions which are obtained by compounding said lubricating oil additives in the lubricating oils.

DESCRIPTION OF PREFERRED EMBODIMENT

In preparation of the overbased sulfurized alkaline earth metal phenates of the present invention, alkyl phenol is used as a raw material. The raw material, alkyl phenol can be obtained by various processes. Generally, it can be obtained by heating the straight-chain alkene and phenol in the presence of ion exchange resin, activated clay or zeolite at temperature between 90° to 190° C. In this case, when alkene having branches such as propylene oligomers or butene oligomers are used instead of the straight chain alkene, the resulting overbased alkaline earth metal phenate sulfide has extremely poor oil solubility, or poor detergency dispersancy and poor heat stability. The carbon number of the above straight-chain alkene is 8 to 32, preferably 12 to 28, more preferably 14 to 28, most preferably 16 to 20. These can be used alone or as a mixture thereof. If the straight-chain alkene is used alone, the alkene with 7 or less carbon atoms results in product phenates with poor solubility in lubricating base oil, and the alkene with 33 or more carbons atoms results in reduced base value. Other olefins can be used with $C_{8-32}$ straight-chain alkene within the range not prejudicial to the object of the present invention. Generally, the content of the other olefin is less than 50 mol %. The examples of the above $C_{8-32}$ straight-chain alkene includes alkenes such as tetradecene, pentadecene, hexadecene, heptadecene, octadecene, nonadecene, eicosene and the like. Among them, α-olefin is particularly preferred.

The alkyl group of the above alkyl phenol may be one (monoalkyl phenol) or a mixture of two or more (dialkyl phenol, trialkyl phenol, etc.). Those with monoalkyl phenol content of 80 mol % or more have better detergency dispersancy and heat stability. The more the content of the ingredients other than monoalkyl phenol is, the less the yield of the alkaline earth metal phenate will be.

The overbased sulfurized alkaline earth metal phenates of the present invention are produced by a step of reaction of the above raw material, i.e., alkyl phenol, with sulfur, alkaline earth metal compound and dihydric alcohol; a step of treatment with carbon dioxide providing basic sulfurized alkaline earth metal phenates; and overbasification step.

The amount of sulfur used herein is not particularly limited, but preferably 0.3 to 0.7 mol based on 1 mol of alkyl phenol. When the amount of sulfur is less than 0.3 mol, the yield of the overbased sulfurized alkaline earth metal phenates is unpreferably reduced. On the other hand, when the amount exceeds 0.7 mol, the base value of the overbased sulfurized alkaline earth metal phenates is reduced.

The type of the alkaline earth metal compound is not particularly limited. Examples of the compound include alkaline earth metal oxide or hydroxide, preferably oxide or hydroxide of calcium, barium, magnesium and the like. More preferred examples of the compound include calcium oxide and calcium hydroxide. The amount of alkaline earth metal compound used herein may be determined depending on the objective base value of the final product, for example, it may be about 0.5 to 2 mol based on 1 mol of phenols.

Various kinds of dihydric alcohols may be used without any particular limitation. However, those with relatively low boiling point, low viscosity and high reactivity may be used. Particularly, those having 2 to 6 carbon atoms are preferred. Dihydric alcohols include ethylene glycol, diethylene glycol, propylene glycol and the like. The amount of the dihydric alcohol used is 0.1 to 3.0 mol, and preferably 0.5 to 1.5 mol per 1 mol alkaline earth metal compound. When the amount of the dihydric alcohol used is less than 0.1 mol, it is not preferable because the conversion of alkaline earth metal compound to the product may be reduced. When it exceeds 3.0 mol, necessity to remove excessive dihydric alcohol from the reaction mixture by distillation may be too large.

The overbased sulfurized alkaline earth metal phenates of the present invention can be obtained by two steps, i.e., a step of producing basic sulfurized alkaline earth metal phenates described, for example, in Japanese Patent Publication Nos. 18/1971, 19566/1975, 2884/1978 and 28878/1985, and a subsequent overbasification step.

In the process for production of the overbased sulfurized alkaline earth metal phenates of the present invention, firstly basic sulfurized alkaline earth metal phenates are obtained. Specifically, the raw material mixture consisting of the above alkyl phenol, sulfur, alkaline earth metal compound and dihydric alcohol is reacted, then sulfurization-metal addition reaction (see, Japanese Patent Publication No. 28878/1985) is carried out under suitable conditions, for example, at 120° to 180° C. Subsequently, water and dihydric alcohol are distilled off from the reaction mixture, then treatment with carbon dioxide is carried out in an autoclave, for example, at 100° to 200° C. under $CO_2$ pressure from ambient pressure to 20 kg/cm². In the production step of the above basic sulfurized alkaline earth metal phenates, diluents may be or may not be used. Example of the preferred diluent includes paraffinic, naphthenic, aromatic mineral oil or a mixture thereof.

Further, the resulting basic sulfurized alkaline earth metal phenates are subjected to overbasification. This overbasification comprises addition of alkaline earth metal compound to the basic sulfurized alkaline earth metal phenates to provide stoichiometric excessive metal salt, addition of solvent and carbon dioxide, and reaction of the resultant mixture with the above basic sulfurized alkaline earth metal phenates. For example, alkaline earth metal compound, aromatic hydrocarbon, monohydric alcohol and, if necessary, water are added to the basic sulfurized alkaline earth metal phenates, then carbon dioxide is introduced to be reacted at 0° to 80° C. under pressure from ambient pressure to 10 kg/cm². The reaction mixture is heated to 120°-160° C. to remove monohydric alcohol and water, then unreacted alkaline earth metal compound is removed by filtration or centrifugation, and the aromatic hydrocarbon is removed under reduced pressure.

The above overbasification may be carried out using the residual alkaline earth metal compound in the production step of basic sulfurized alkaline earth metal phenates. In this case, when the amount of the alkaline earth metal compound is insufficient, it may be added as needed.

As the above aromatic hydrocarbon, benzene, toluene, xylene and the like are preferred. As the above monohydric alcohol, methanol, ethanol and the like are preferred. The amount of the aromatic hydrocarbon used is preferably 100 to 1000 mol %, particularly 200 to 500 mol % based on the basic sulfurized alkaline earth metal phenates. The amount of the monohydric alcohol is preferably 50 to 800 mol %, particularly 100 to 400 mol %. The amount of the water used is preferably 0 to 200 mol %, particularly 20 to 100 mol %.

The amount of carbon dioxide used is preferably 1 to 70 mol %, more preferably 10 to 65 mol %, most preferably 30 to 60 mol % per alkaline earth metal compound. When carbon dioxide is less than 1 mol % per alkaline earth metal compound, overbased sulfurized alkaline earth metal phenates with sufficient base value may not be obtained, and when it exceeds 70 mol %, the product may be gelated during the production step.

To facilitate handling of the reactants, reaction intermediates or product, a suitable diluent may be used. The above reaction may be carried out in the presence of diluents. Preferable diluents are, for example, paraffinic, naphthenic or aromatic base mineral oil or a mixture thereof.

The base value of the overbased sulfurized alkaline earth metal phenates obtained by this overbasification can be freely adjusted by the charge of the basic sulfurized alkaline earth metal phenates, carbon dioxide and solvent. However, when the base value exceeds 330 mg KOH/g, the solubility into the lubricating base oil undesirably decreases. When the base value is less than 240 mg KOH/g, oxidation stability may be deteriorated. Accordingly, the base value of the overbased sulfurized alkaline earth metal phenates is preferably 240 to 330 mg KOH/g. Particularly, 250 to 300 mg KOH/g is more preferred.

Thus obtained overbased sulfurized alkaline earth metal phenates of the present invention have various applications as lubricating oil additives, and they may be used independently or as main ingredient with other additive ingredients, to constitute detergent-dispersants with extremely high performance.

Further, the above lubricating oil additives (overbased sulfurized alkaline earth metal phenates) may be compounded with the lubricating oil to produce the lubricating oil compositions of the present invention.

As to above mentioned lubricating oil, various kinds of lubricating oils, which are ordinarily used, may be available. For example, mineral oil (naphthenic base oil, paraffinic base oil, intermediate base oil), synthetic oil (polymerized olefin, diester polybutene, silicone oil, polyalkylene glycol, halocarbon, phosphate ester, silicate ester, etc.), animal and vegetable fats and oils (castor oil, rape seed oil, palm oil, lard, whale oil, etc.), composite oil (mineral oil + animal and vegetable fats and oils, etc.).

In such lubricating oil composition, the ratio of the above overbased sulfurized alkaline earth metal phenates compounded may be suitably selected depending on the conditions. Particularly, it is, for example, in the range from 1 to 50% by weight (based on the total amount of the composition), preferably in the range from 5 to 30% by weight, but it is not construed to be limited to the above range.

The lubricating oil composition of the present invention may be obtained by compounding the lubricating oil additives, i.e., overbased sulfurized earth metal phenates to lubricating oil. Further, various kinds of additives such as ashless detergent-dispersant, antioxidant, viscosity index improver, defoaming agent, anticorrosive, pour point depressant, extreme pressure agent, oiliness improver and the like may be compounded.

As described above, the overbased sulfurized alkaline earth metal phenates of the present invention, which has high base value and excellent solubility in oil, can be effectively used as lubricating oil additives.

The lubricating oil compositions with lubricating oil additives of the present invention are excellent in detergency-dispersancy, heat stability and solubility in oil, and is highly practical.

Accordingly, the overbased sulfurized alkaline earth metal phenates of the present invention may be widely and effectively used in various fields, for example, as an additive for lubricating oil for various internal combustion engines (gasoline engine, diesel engine, gas engine, etc.).

The process for production of the present invention is an excellent process to obtain the overbased sulfurized alkaline earth metal phenates.

The present invention will be explained in detail in the following Reference Examples, Examples and Comparative Examples, but it is not construed to be limited to them.

Firstly, synthesis of alkylphenol will be described in the following Reference Examples.

REFERENCE EXAMPLE 1

Phenol (376 g, 4 mol), hexadecene ($\alpha$-olefin) (449 g, 2 mol) and ion exchange resin (trade-mark: Dia-ion RCP-145HD) (34 g) were charged in a reactor and stirred at 110° C. for 2 hours. The ion exchange resin was filtered off and the excessive phenol and hexadecene were distilled off under reduced pressure. After distillation under reduced pressure, mono-hexadecylphenol was obtained. The yield was 510 g.

REFERENCE EXAMPLE 2

The same operation as in Reference Example 1 was carried out with the exception that distillation of mon-hexadecylphenol under reduced pressure was not carried out, to prepare hexadecylphenol. The composition of the resulting hexadecylphenol was as follows: mono-hexadecylphenol, 80 mol %; di-hexadecylphenol, 20 mol %. The yield was 560 g.

REFERENCE EXAMPLE 3

The same operation as in Reference Example 1 was carried out with the exception that dodecene ($\alpha$-olefin) (337 g, 2 mol) was used instead of hexadecene ($\alpha$-olefin) (449 g, 2 mol). Distillation under reduced pressure provided mono-dodecylphenol. The yield was 430 g.

REFERENCE EXAMPLE 4

The same operation as in Reference Example 1 was carried out with the exception that tetradecene ($\alpha$-olefin) (393 g, 2 mol) was used instead of hexadecene ($\alpha$-olefin) (449 g, 2 mol). Distillation under reduced pressure provided mono-tetradecylphenol. The yield was 465 g.

REFERENCE EXAMPLE 5

The same operation as in Reference Example 1 was carried out with the exception that a mixture of dodecene ($\alpha$-olefin) (112 g, 0.67 mol), tetradecene ($\alpha$-olefin) (131 g, 0.67 mol) and hexadecene ($\alpha$-olefin) (150 g, 0.67 mol) was used instead of hexadecene ($\alpha$-olefin) (449 g, 2 mol). Distillation under reduced pressure provided a mixture of mono-dodecylphenol, mono-tetradecylphenol and mono-hexadecylphenol. The yield was 435 g in total.

REFERENCE EXAMPLE 6

The same operation as in Reference Example 1 was carried out with the exception that dodecene (propylene oligomer) (337 g, 2 mol) was used instead of hexadecene ($\alpha$-olefin) (449 g, 2 mol). Distillation under reduced pressure provided mono-dodecylphenol. The yield was 445 g.

REFERENCE EXAMPLE 7

The same operation as in Reference Example 1 was carried out with the exception that pentadecene (propylene oligomer) (421 g, 2 mol) was used instead of hexadecene ($\alpha$-olefin) (449 g, 2 mol). Distillation under reduced pressure provided mono-pentadecylphenol. The yield was 505 g.

REFERENCE EXAMPLE 8

The same operation as in Reference Example 1 was carried out with the exception that octadecene (propylene oligomer) (505 g, 2 mol) was used instead of hexadecene (α-olefin) (449 g, 2 mol). Distillation under reduced pressure provided mono-octadecylphenol. The yield was 555 g.

EXAMPLE 1

Mono-hexadecylphenol prepared in Reference Example 1 (319 g, 1 mol), sulfur (16 g, 0.5 mol), calcium hydroxide (89 g, 0.9 mol) and 150 neutral oil (100 g) were charged and stirred in a reactor equipped with a stirrer, a cooling tube and a nitrogen-inlet tube. Ethylene glycol (62 g, 1 mol) was added to the resulting suspension and reaction was carried in a stream of nitrogen at 140° C. for 4 hours. The generated water and excessive ethylene glycol were distilled off under reduced pressure to give dark yellow distillation residue. The resulting distillation residue was transferred into an autoclave, pressurized at 5 kg/cm$^2$ with carbon dioxide and stirred at 160° C. for 2 hours to absorb carbon dioxide.

The reaction mixture was diluted with toluene (300 ml). After unreacted calcium hydroxide and the like were removed by centrifugation, toluene and unreacted hexadecylphenol were distilled off under reduced pressure to give a dark yellow, transparent product, basic calcium phenate sulfide. The yield of the resulting product was 320 g. The base value was 154 mg KOH/g.

Subsequently, the above resulting basic sulfurized calcium phenates (210 g), calcium hydroxide (25 g), toluene (140 g), methanol (85 g) and water (7 g) were charged in a reactor with a stirrer and a CO$_2$ inlet tube, and vigorously stirred at room temperature while blowing carbon dioxide (9.2 g) to introduce calcium carbonate into the product. After methanol and water were distilled off at 140° C. and calcium hydroxide was filtered off, toluene was distilled off under reduced pressure to give the objective product, overbased sulfurized calcium phenate. The yield, kinematic viscosity (100° C.), base value, Ca (calcium) content and S (sulfur) content of the resulting product were 220 g, 43.7 cSt, 267 mg KOH/g, 8.88% by weight and 3.10% by weight, respectively.

EXAMPLE 2

Basic sulfurized calcium phenate with base value of 154 mg KOH/g obtained in Example 1 (210 g), calcium hydroxide (37.7 g), toluene (210 g), methanol (126 g) and water (10.5 g) were charged and stirred in a reactor equipped with a stirrer and a carbon dioxide-inlet tube. The content was vigorously stirred at room temperature while blowing carbon dioxide (13.9 g) to introduce calcium carbonate into the product. After methanol and water were distilled off and calcium hydroxide was filtered off, toluene was distilled off under reduced pressure to give the objective product, overbased sulfurized calcium phenate. The yield, kinematic viscosity (100° C.), base value, Ca content and S content of the resulting product were 230 g, 162.6 cSt, 296 mg KOH/g, 10.4% by weight and 3.04% by weight, respectively.

EXAMPLE 3

Basic sulfurized calcium phenate with base value of 154 mg KOH/g obtained in Example 1 (210 g), calcium hydroxide (50.1 g), toluene (280 g), methanol (168 g) and water (14 g) were charged and stirred in a reactor equipped with a stirrer and a carbon dioxide-inlet tube. The content was vigorously stirred at room temperature while blowing carbon dioxide (18.5 g) to introduce calcium carbonate into the product. After methanol and water were distilled off and calcium hydroxide was filtered off, toluene was distilled off under reduced pressure to give the objective product, overbased sulfurized calcium phenate. The yield, kinematic viscosity (100° C.), base value, Ca content and S content of the resulting product were 230·g, 310.1 cSt, 327 mg KOH/g, 11.1% by weight and 3.00% by weight, respectively.

EXAMPLE 4

The same operation as in Example 1 was carried out with the exception that hexadecylphenol containing 20 mol% di-hexadecyl phenol prepared in Reference Example 2 (365 g, 1 mol) was used instead of monohexadecylphenol (319 g). The yield, kinematic viscosity (100° C.), base value, Ca content and S content of the resulting product were 220 g, 91.8 cSt, 244 mg KOH/g, 8.25% by weight and 3.32% by weight, respectively.

EXAMPLE 5

The same operation as in Example 1 was carried out with the exception that a mixture of dodecylphenol (87 g, 0.33 mol), tetradecylphenol (97 g, 0.33 mol) and hexadecylphenol (106 g, 0.33 mol) prepared in Reference Examples 1, 3 and 4, respectively, was used instead of mono-hexadecylphenol (319 g). The yield, kinematic viscosity (100° C.), base value, Ca content and S content of the resulting product were 220 g, 87.4 cSt, 251 mg KOH/g, 8.45% by weight and 3.11% by weight, respectively.

EXAMPLE 6

The same operation as in Example 1 was carried out with the exception that a mixture of dodecylphenol, tetradecylphenol and hexadecylphenol prepared in Reference Example 5 (291 g, 1 mol) was used instead of mono-hexadecylphenol (319 g). The yield, kinematic viscosity (100° C.), base value, Ca content and S content of the resulting product were 220 g, 122.6 cSt, 250 mg KOH/g, 9.01% by weight and 3.04% by weight, respectively.

EXAMPLE 7

Mono-hexadecylphenol prepared in Reference Example 1 (319 g, 1 mol), sulfur (16 g, 0.5 mol) and calcium hydroxide (63 g, 0.8 mol) were charged and stirred in a reactor equipped with a stirrer, a cooling tube and a nitrogen-inlet tube. Ethylene glycol (31 g, 0.5 mol) was added to the resulting suspension and reaction was carried under a nitrogen stream at 140° C. for 4 hours. The generated water and an excessive ethylene glycol were distilled off to give a dark yellow distillation residue. The resulting distillation residue was transferred into an autoclave, pressurized at 5 kg/cm$^2$ with carbon dioxide and stirred at 160° C. for an hour to absorb carbon dioxide. Forty five grams of calcium hydroxide remained in the resulting reaction mixture.

Subsequently, the reaction mixture was charged in a reactor with a stirrer and a CO$_2$ inlet tube, to which were added xylene (250 g) and methanol (120 g), and vigorously stirred at room temperature while blowing carbon dioxide (13 g, 0.3 mol) at 200 ml/min. After methanol and water were distilled off and sludge was filtered off from the reaction mixture, xylene and unreacted hexadecylphenol were distilled off under reduced pressure, to which was added a mineral oil (120 g).

The yield, base value, kinematic viscosity (100° C.), Ca (calcium) content, S (sulfur) content of the overbased sulfurized calcium phenate, and recovered hexadecylphenol and sludge (oil removed) were 340 g, 240 mg KOH/g, 29.0 cSt, 8.4% by weight and 2.9% by weight, and 150 g, 10 g, respectively.

EXAMPLE 8

The same operation as in Example 7 was carried out with the exception that water (10 g) was further added as a solvent. Forty five grams of calcium hydroxide remained in the resulting reaction mixture after treatment with carbon dioxide.

The yield, base value, kinematic viscosity (100° C), Ca content, S content of the overbased sulfurized calcium phenate, and recovered hexadecylphenol and sludge were 340 g, 245 mg KOH/g, 29.0 cSt, 8.4% by weight and 2.9% by weight, and 150 g, 10 g, respectively.

EXAMPLE 9

The same operation as in Example 8 was carried out with the exception that toluene (300 g) was used instead of xylene in overbasification reaction. Forty seven grams of calcium hydroxide remained in the resulting reaction mixture after treatment with carbon dioxide.

The yield, base value, kinematic viscosity (100° C.), Ca content, S content of the resulting overbased sulfurized calcium phenate, and recovered hexadecylphenol and sludge were 330 g, 243 mg KOH/g, 28.3 cSt, 8.3% by weight and 2.9% by weight, and 160 g, 12 g, respectively.

EXAMPLE 10

The same operation as in Example 8 was carried out with the exception that dodecylphenol prepared in Reference Example 3 (262 g, 1 mol) was used instead of hexadecylphenol and the amount of the mineral oil added was changed to 100 g. Forty seven grams of calcium hydroxide remained in the resulting reaction mixture after treatment with carbon dioxide.

The yield, base value, kinematic viscosity (100° C.), Ca content, S content of the overbased sulfurized calcium phenate, and recovered hexadecylphenol and sludge were 275 g, 258 mg KOH/g, 220 cSt, 8.8% by weight and 2.6% by weight, and 135 g, 9 g, respectively.

EXAMPLE 11

The same operation as in Example 8 was carried out with the exception that a mixture of mono-dodecylphenol (87 g, 0.33 mol), mono-tetradecylphenol (97 g, 0.33 mol) and mono-hexadecylphenol (106 g, 0.33 mol) prepared in Reference Examples 3, 4, 1, respectively, was used instead of hexadecylphenol, and the amount of added mineral oil was changed to 100 g. Forty five grams of calcium hydroxide remained in the resulting reaction mixture after treatment with carbon dioxide.

The yield, base value, kinematic viscosity (100° C.), Ca content, S content of the resulting overbased sulfurized calcium phenate, and recovered hexadecylphenol and sludge were 285 g, 250 mg KOH/g, 122 cSt, 9.0% by weight and 2.9% by weight, and 155 g, 10 g, respectively.

COMPARATIVE EXAMPLE 1

Dodecylphenol (262 g, 1 mol) obtained by reacting propylene tetramer prepared in Reference Example 6 with phenol was used. Dodecylphenol (262 g, 1 mol), sulfur (16 g, 0.5 mol), calcium hydroxide (89 g, 0.9 mol) and 150 neutral oil (100 g) were charged and stirred in a reactor equipped with a stirrer, a cooling tube and a nitrogen-inlet tube. Ethylene glycol (62 g, 1 mol) was added to the resulting suspension and reaction was carried under a nitrogen stream at 140° C. for 4 hours. The generated water and an excessive ethylene glycol were distilled off to give a dark yellow distillation residue. The resulting distillation residue was transferred into an autoclave, pressurized at 5 kg/cm$^2$ with carbon dioxide and stirred at 160° C. for 2 hours to absorb carbon dioxide.

The reaction mixture was diluted with toluene (300 ml). After unreacted calcium hydroxide and the like were removed by centrifugation, toluene and unreacted hexadecylphenol were distilled off under reduced pressure to give a dark yellow, transparent product, basic sulfurized calcium phenate. The yield of the resulting product was 270 g. The base value was 169 mg KOH/g.

Subsequently, the above resulting basic sulfurized calcium phenate (210 g), calcium hydroxide (12.5 g), toluene (140 g), methanol (85 g) and water (7 g) were charged in a reactor equipped with a stirrer and CO$_2$ inlet tube, and vigorously stirred at room temperature while blowing carbon dioxide (4.6 g) to introduce calcium carbonate into the product. After methanol and water were distilled off at 140° C. and calcium hydroxide was filtered off, toluene was distilled off under reduced pressure to give the objective product, overbased sulfurized calcium phenate. The yield, kinematic viscosity (100° C.), base value, Ca content and S content of the resulting product were 210 g, 344.1 cSt, 212 mg KOH/g, 7.31% by weight and 3.74% by weight, respectively.

COMPARATIVE EXAMPLE 2

The same operation as in Example 1 was carried out with the exception that a mixture of dodecylphenol (87 g, 0.33 mol), pentadecylphenol (102 g, 0.33 mol) and octadecylphenol (116 g, 0.33 mol), which were obtained by reacting propylene oligomers prepared in Reference Examples 6, 7 and 8 with phenol, was used instead of hexadecylphenol (319 g) obtained by reacting α-olefin and phenol. The yield, kinematic viscosity (100° C.), base value, Ca content and S content of the resulting product were 210 g, 293.3 cSt, 233 mg KOH/g, 7.74% by weight and 3.97% by weight, respectively.

COMPARATIVE EXAMPLE 3

The same operation as in Example 1 was carried out with the exception that dodecylphenol (262 g, 1 mol) prepared in Reference Example 3 was used instead of mono-hexadecylphenol (319 g). The yield, kinematic viscosity (100° C.), base value, Ca content and S content of the resulting product were 220 g, 320.0 cSt, 246 mg KOH/g, 8.70% by weight and 2.54% by weight, respectively.

COMPARATIVE EXAMPLE 4

Basic sulfurized calcium phenate (210 g) obtained by the same procedure as in Example 1, calcium hydroxide (12.5 g), toluene (140 g), methanol (85 g) and water (7 g) were charged in a reactor equipped with a stirrer and a $CO_2$ inlet, and the resultant was stirred vigorously at room temperature while blowing carbon dioxide (4.6 g) to introduce calcium carbonate into the product. After methanol and water were removed from the reaction mixture by distillation at 140° C., calcium hydroxide was removed by centrifugation, toluene was distilled off under reduced pressure to give a product. The yield, kinematic viscosity (100° C.), base value, Ca content and S content of the resulting product were 200 g, 41.7 cSt, 196 mg KOH/g, 6.72% by weight and 3.40% by weight, respectively.

COMPARATIVE EXAMPLE 5

The crude product obtained in Example 1 (based value: 154 mg KOH/g, 210 g), calcium hydroxide (base value: 154 mg KOH/g, 62.7 g), toluene (350 g), methanol (210 g) and water (17.5 g) were charged in a reactor equipped with a stirrer and a $CO_2$-inlet tube, and vigorously stirred at room temperature while blowing carbon dioxide (23.1 g) to introduce calcium carbonate into the product trying to obtain overbased sulfurized calcium phenate with base value more than 350 mg KOH/g. The result product was solidified.

COMPARATIVE EXAMPLE

Mono-hexadecylphenol (319 g, 1 mol), sulfur (16 g, 0.5 mol), calcium hydroxide (63 g, 0.8 mol) and a mineral oil (100 g) were charged and stirred in a reactor equipped with a stirrer, a cooling tube and a nitrogen-inlet tube. Ethylene glycol (31 g, 0.5 mol) was added to the resulting suspension and reaction was carried under a nitrogen stream at 140° C. for 4 hours. The generated water and an excessive ethylene glycol were distilled off under reduced pressure to give a dark yellow distillation residue. The resulting distillation residue was transferred into an autoclave, pressurized at 5 kg/cm² with carbon dioxide and stirred at 160° C. for an hour to absorb carbon dioxide. The reaction mixture was diluted with xylene (300 ml). After unreacted calcium hydroxide and the like were removed by centrifugation, xylene and unreacted hexadecylphenol were distilled off under reduced pressure to give a dark yellow product.

The yield, base value, kinematic viscosity (100° C.), Ca (calcium) content, S (sulfur) content of the basic sulfurized calcium phenate, and recovered hexadecylphenol and sludge were 310 g, 147 mg KOH/g, 31.8 cSt, 5.1% by weight and 3.4% by weight, and 160 g, 50 g, respectively.

COMPARATIVE EXAMPLE 7

The same operation as in Example 8 was carried out with the exception that only xylene (300 g) was used as a solvent in the overbasification reaction. Carbon dioxide blown during the reaction was not absorbed and overbasification was not sufficiently carried out.

The yield, base value, kinematic viscosity (100° C.), Ca content, S content of the overbased sulfurized calcium phenate, and recovered hexadecylphenol and sludge were 305 g, 131 mg KOH/g, 17.6 cSt, 4.7% by weight and 3.2% by weight, and 160 g, 49 g, respectively.

Table 1 shows the properties of (over)based sulfurized calcium phenates sulfides obtained in Examples and Comparative Examples and commercially available calcium phenates. Table 2 shows the compounding concentration of the lubricating oil composition (engine oil) containing other additives and (over)based sulfurized calcium phenates of Examples 1 to 9, Comparative Examples 1 to 5 and commercially available products A and B. Table 3 shows properties, performance and solubilities of the lubricating oil composition formulated according to Table 2.

As is obvious from Table 3, the product having alkyl group of propylene oligomer type (e.g. Comparative Examples 1 and 2) are inferior in solubility. Even that of α-olefin type (Comparative Example 3, having short alkyl group of $C_{12}$) is inferior in solubility when it is solely used.

Further, the compositions 14 and 15 (commercially available products A and B) gave poor results in panel coking test and hot tube test. On the other hand, those using alkylphenol prepared from α-olefin and phenol (compositions 1 to 9) gave excellent results in panel coking test, hot tube test and solubility. Further, those using raw materials containing only monoalkylphenol are superior to those using raw materials containing dialkylphenol.

TABLE 1

| Sample | Kinematic Viscosity (100° C., cSt) | Base Value (mg KOH/g) | Ca Content (wt %) | S Content (wt %) | Sludge (g) |
|---|---|---|---|---|---|
| Example 1 | 43.7 | 267 | 8.88 | 3.10 | — |
| Example 2 | 162.6 | 296 | 10.4 | 3.04 | — |
| Example 3 | 310.1 | 327 | 11.1 | 3.00 | — |
| Example 4 | 91.8 | 244 | 8.25 | 3.32 | — |
| Example 5 | 87.4 | 251 | 8.45 | 3.11 | — |
| Example 6 | 122.6 | 250 | 9.01 | 3.04 | — |
| Example 7 | 29.0 | 240 | 8.4 | 2.9 | 10 |
| Example 8 | 29.0 | 245 | 8.4 | 2.9 | 10 |
| Example 9 | 28.3 | 243 | 8.3 | 2.9 | 12 |
| Example 10 | 220 | 258 | 8.8 | 2.6 | 9 |
| Example 11 | 122 | 250 | 9.0 | 2.9 | 10 |
| Comparative Example 1 | 344.1 | 212 | 7.31 | 3.74 | — |
| Comparative Example 2 | 293.3 | 233 | 7.74 | 3.97 | — |
| Comparative Example 3 | 320.0 | 246 | 8.70 | 2.54 | — |
| Comparative Example 4 | 41.7 | 196 | 6.72 | 3.40 | — |
| Comparative Example 6 | 31.8 | 147 | 5.1 | 3.4 | 50 |
| Comparative Example 7 | 17.6 | 131 | 4.7 | 3.2 | 49 |
| Commercial Product A | 113.8 | 246 | 8.97 | 3.10 | — |
| Commercial Product B | 282.5 | 324 | 1.11 | 3.14 | — |

TABLE 2

| | Employed Calcium Phenate | Concentration of Added Ingredient (wt %) | | | | |
|---|---|---|---|---|---|---|
| | | Mineral Oil | | Additive | | |
| | | 500 Neutral | Bright Stock | Calcium Sulfonate *1 | Bisimide | Calcium Phenate |
| Composition 1 | Example 1 | 46.0 | 25.5 | 15.0 | 0.5 | 13.0 |
| Composition 2 | Example 2 | 46.0 | 27.0 | 15.0 | 0.5 | 11.5 |
| Composition 3 | Example 3 | 46.0 | 28.5 | 15.0 | 0.5 | 10.0 |
| Composition 4 | Example 4 | 46.0 | 25.5 | 15.0 | 0.5 | 13.0 |
| Composition 5 | Example 5 | 46.0 | 25.5 | 15.0 | 0.5 | 13.0 |
| Composition 6 | Example 6 | 46.0 | 25.5 | 15.0 | 0.5 | 13.0 |
| Composition 7 | Example 7 | 46.0 | 25.5 | 15.0 | 0.5 | 13.0 |
| Composition 8 | Example 8 | 46.0 | 25.5 | 15.0 | 0.5 | 13.0 |
| Composition 9 | Example 9 | 46.0 | 25.5 | 15.0 | 0.5 | 13.0 |
| Composition 10 | Comparative Example 1 | 46.0 | 23.5 | 15.0 | 0.5 | 15.0 |
| Composition 11 | Comparative Example 2 | 46.0 | 23.5 | 15.0 | 0.5 | 15.0 |
| Composition 12 | Comparative Example 3 | 46.0 | 25.5 | 15.0 | 0.5 | 13.0 |
| Composition 13 | Comparative Example 4 | 46.0 | 25.5 | 15.0 | 0.5 | 13.0 |
| Composition 14 | Commercial Product A | 46.0 | 25.5 | 15.0 | 0.5 | 13.0 |
| Composition 15 | Commercial Product B | 46.0 | 28.5 | 15.0 | 0.5 | 10.0 |

*1: Total base value: 300 (mg KOH/g)

TABLE 3

| | Properties | | | | Panel Coking Test *2 (mg) | Performance Evaluation | | | |
|---|---|---|---|---|---|---|---|---|---|
| | Kinematic Viscosity (40° C., cSt) | Viscosity Index | Total Acid Value (mg KOH/g) | Base Value *1 (mg KOH/g) | | ISOT *3 Test (165.5° C., 72 h) | | | |
| | | | | | | Kinematic Viscosity (40° C, cSt) | (Ratio of Kinematic Viscosity) | Total Acid Value (mg KOH/g) | (Increase of Total Acid Value) |
| Composition 1 | 190.4 | 122 | 1.56 | 76.0 | 25 | 234.2 | (1.23) | 3.40 | (1.84) |
| Composition 2 | 189.7 | 123 | 1.64 | 73.2 | 27 | 227.6 | (1.20) | 3.89 | (2.25) |
| Composition 3 | 206.5 | 124 | 2.30 | 71.5 | 26 | 233.9 | (1.13) | 4.14 | (1.84) |
| Composition 4 | 216.5 | 128 | 1.71 | 73.5 | 35 | 278.6 | (1.29) | 4.27 | (2.56) |
| Composition 5 | 207.3 | 125 | 1.37 | 74.8 | 25 | 252.1 | (1.21) | 3.85 | (2.48) |
| Composition 6 | 189.0 | 121 | 1.92 | 69.7 | 25 | 230.0 | (1.22) | 4.45 | (2.53) |
| Composition 7 | 173.0 | 123 | 2.21 | 75.6 | 19 | 212.5 | (1.23) | 3.73 | (1.52) |
| Composition 8 | 174.6 | 121 | 1.56 | 73.6 | 25 | 207.0 | (1.19) | 3.93 | (2.37) |
| Composition 9 | 180.4 | 122 | 1.11 | 73.9 | 27 | 220.7 | (1.22) | 3.68 | (2.57) |
| Composition 10 | 214.7 | 111 | 1.57 | 74.5 | 49 | 283.4 | (1.32) | 4.07 | (2.50) |
| Composition 11 | 212.2 | 111 | 1.46 | 72.2 | 47 | 275.9 | (1.30) | 3.96 | (2.48) |
| Composition 12 | 209.5 | 112 | 1.71 | 74.0 | 33 | 249.1 | (1.19) | 4.26 | (2.55) |
| Composition 13 | 204.4 | 112 | 1.41 | 65.3 | 53 | 314.8 | (1.54) | 4.74 | (3.33) |
| Composition 14 | 197.7 | 111 | 2.57 | 66.4 | 35 | 225.5 | (1.24) | 6.42 | (3.85) |
| Composition 15 | 204.6 | 125 | 2.50 | 64.6 | 279 | 209.0 | (1.54) | 3.91 | (2.31) |

| | Performance Evaluation | | | | |
|---|---|---|---|---|---|
| | ISOT *3 (165.5° C., 72 h) | | | Hot Tube Test (320° C.) point *4 | Oil Solubility *5 (60° C. × 5 days) |
| | Base Value (mg KOH/g) | (Decrease of Base Value) | Content of Insolubles (wt %) | | |
| Composition 1 | 71.2 | (4.8) | 0.01 | 9 | ○ |
| Composition 2 | 70.3 | (3.1) | 0.01 | 9 | ○ |
| Composition 3 | 70.6 | (0.9) | 0.01 | 8 | ○ |
| Composition 4 | 68.0 | (5.5) | 0.02 | 7 | ○ |
| Composition 5 | 70.0 | (4.8) | 0.02 | 9 | ○ |
| Composition 6 | 64.8 | (4.9) | 0.02 | 8 | ○ |
| Composition 7 | 70.2 | (5.4) | 0.02 | 9 | ○ |
| Composition 8 | 69.4 | (4.2) | 0.02 | 9 | ○ |
| Composition 9 | 69.1 | (4.8) | 0.01 | 9 | ○ |
| Composition 10 | 69.7 | (4.8) | 0.03 | 6 | X (Precipitation) |
| Composition 11 | 67.3 | (4.9) | 0.03 | 6 | X (Precipitation) |
| Composition 12 | 67.9 | (6.1) | 0.02 | 7 | X (Precipitation) |
| Composition 13 | 57.5 | (7.8) | 0.02 | 8 | ○ |
| Composition 14 | 35.3 | (31.1) | 0.04 | 0 (Clogging) | ○ |
| Composition 15 | 26.7 | (37.9) | 0.03 | 0 (Clogging) | ○ |

*1: According to perchloric acid method
*2: Panel coking test was carried out according to Fed 791B Method 3462 (1969).
*3: ISOT test was carried out according to JIS K2514.
*4: Hot tube test was carried out as follows. A lubricating oil composition (0.3 ml/hr) and an air (10 ml/min) were flowed through a glass tube (inner diameter = 2 mm) for 16 hours while keeping the temperature of the glass tube at 320° C. Lacquer adhered to the glass tube was scored by comparing with the color samples, transparent equaling 10 and black equaling 0.
*5: During the oil solubility test, the samples were stored at 60° C. for 5 days.

What is claimed is:

1. A process for producing overbased sulfurized alkaline earth metal phenates having a base value of 240 to 330 mg KOH/g, which comprises reacting alkyl phenol, prepared from $C_{14-28}$ straight-chain alkene and phenol, with sulfur, alkaline earth metal compound and dihydric alcohol to prepare a reaction mixture, then distilling off water and dihydric alcohol from the reaction mixture, subsequently treating the reaction mixture with carbon dioxide to give basic sulfurized alkaline earth metal phenates, and further subjecting to overbasification using a solvent containing aromatic hydrocarbon and at least one of monohydric alcohol and water.

2. The process according to claim 1, wherein overbasification is carried out using a solvent consisting of aromatic hydrocarbon and monohydric alcohol.

3. The process according to claim 1, wherein overbasification is carried out using a solvent consisting of aromatic hydrocarbon, monohydric alcohol and water.

4. The process according to claim 2, wherein the aromatic hydrocarbon is benzene, toluene or xylene and the monohydric alcohol is methanol or ethanol.

5. A process for producing overbased sulfurized alkaline earth metal phenates having a base value of 240 to 330 mg KOH/g, which comprises reacting alkyl phenol prepared from $C_{14-28}$ straight-chain alkene and phenol, with sulfur, alkaline earth metal compound and dihydric alcohol to prepare a reaction mixture, then distilling off water and dihydric alcohol from the reaction mixture, subsequently treating the reaction mixture with carbon dioxide, and then subjecting to overbasification using alkaline earth metal compound remaining in the reaction mixture in the presence of a solvent containing aromatic hydrocarbon and at least one of monohydric alcohol and water.

6. The process according to claim 5, wherein overbasification is carried out using a solvent consisting of aromatic hydrocarbon and monohydric alcohol.

7. The process according to claim 5, wherein overbasification is carried out using a solvent consisting of aromatic hydrocarbon, monohydric alcohol and water.

8. The process according to claim 6, wherein the aromatic hydrocarbon is benzene, toluene or xylene and the monohydric alcohol is methanol or ethanol.

* * * * *